(12) United States Patent
Elekes et al.

(10) Patent No.: US 11,501,925 B2
(45) Date of Patent: Nov. 15, 2022

(54) CAPACITOR

(71) Applicant: TDK Electronics AG, Munich (DE)

(72) Inventors: Krisztián Elekes, Káld (HU); Róbert Bösze, Tanakajd (HU); Tamás Lakatár, Köszeg (HU); Rudolf Wittmann, Heidenheim (DE)

(73) Assignee: TDK ELECTRONICS AG, Munich (DE)

( * ) Notice: Subject to any disclaimer, the term of this patent is extended or adjusted under 35 U.S.C. 154(b) by 13 days.

(21) Appl. No.: 17/286,790

(22) PCT Filed: Oct. 30, 2019

(86) PCT No.: PCT/EP2019/079702
§ 371 (c)(1),
(2) Date: Apr. 19, 2021

(87) PCT Pub. No.: WO2020/089316
PCT Pub. Date: May 7, 2020

(65) Prior Publication Data
US 2021/0343481 A1    Nov. 4, 2021

(30) Foreign Application Priority Data
Oct. 31, 2018 (DE) .......................... 102018127263.4

(51) Int. Cl.
*H01G 9/12* (2006.01)
*H01G 9/035* (2006.01)

(52) U.S. Cl.
CPC ............... *H01G 9/12* (2013.01); *H01G 9/035* (2013.01)

(58) Field of Classification Search
CPC ................................. H01G 9/12; H01G 9/035
See application file for complete search history.

(56) References Cited

U.S. PATENT DOCUMENTS

| | | | | | |
|---|---|---|---|---|---|
| 3,688,162 | A | * | 8/1972 | Willy | H01G 9/12 361/521 |
| 3,935,030 | A | * | 1/1976 | Sperandio | H01M 50/35 220/203.11 |
| 4,245,277 | A | * | 1/1981 | van Gils | H01G 9/12 29/25.03 |
| 5,579,203 | A | * | 11/1996 | Klaschka | H01G 9/10 361/519 |
| 9,875,856 | B2 | | 1/2018 | Kuroki et al. | |
| 10,714,721 | B2 | | 7/2020 | Li et al. | |
| 10,833,299 | B2 | * | 11/2020 | Kambayashi | H01G 9/10 |
| 11,031,580 | B2 | * | 6/2021 | Lee | H01M 50/3425 |
| 2014/0240900 | A1 | * | 8/2014 | Mori | H01G 9/08 361/521 |

(Continued)

FOREIGN PATENT DOCUMENTS

| CN | 101212033 A | 7/2008 |
|---|---|---|
| CN | 107394063 A | 11/2017 |
| DE | 4401034 A1 | 7/1995 |

(Continued)

*Primary Examiner* — Dion R. Ferguson
(74) *Attorney, Agent, or Firm* — Slater Matsil, LLP

(57) ABSTRACT

A capacitor is disclosed. In an embodiment a capacitor includes a receptacle with an opening, at least one capacitor element disposed inside of the receptacle and a lid sealing the receptacle, wherein a vent is arranged in a recess in an inner surface of the lid.

14 Claims, 6 Drawing Sheets

(56) References Cited

U.S. PATENT DOCUMENTS

2021/0343481 A1\* 11/2021 Elekes .................... H01G 9/12

FOREIGN PATENT DOCUMENTS

| | | | | |
|---|---|---|---|---|
| DE | 102015119844 A1 \* | 5/2017 | ............ | H01G 9/008 |
| EP | 1786007 A1 \* | 5/2007 | ............ | H01G 11/10 |
| JP | H0845796 A | 2/1996 | | |
| JP | H08162086 A | 6/1996 | | |
| JP | 2010165590 A | 7/2010 | | |
| JP | 2017084974 A | 5/2017 | | |
| WO | WO-2007004467 A1 \* | 1/2007 | ............ | H01G 9/10 |
| WO | 2013073192 A1 | 5/2013 | | |
| WO | 2014199639 A | 12/2014 | | |
| WO | WO-2016093100 A1 \* | 6/2016 | ............ | H01G 11/16 |
| WO | WO2020218623 \* | 10/2020 | ............ | H01G 11/14 |

\* cited by examiner

CAPACITOR

This patent application is a national phase filing under section 371 of PCT/EP2019/079702, filed Oct. 30, 2019, which claims the priority of German patent application 102018127263.4, filed Oct. 31, 2018, each of which is incorporated herein by reference in its entirety.

TECHNICAL FIELD

The present invention concerns a capacitor comprising a sealing lid with a vent arranged in the lid.

BACKGROUND

A vent is a default component often provided in a lid of a capacitor to release overpressure built up in a receptacle due to heat generation in the capacitor because of, e.g., a malfunction or a leakage current. This vent protrudes into the receptacle of the capacitor and is exposed to precipitations and fluids in the capacitor. For this reason the precipitations and fluids often may enter unhindered the vent and are often blocking the vent, making it non-functional and are cause to premature malfunction. Especially in electrolytic capacitors, in which the electrolyte enters the vent, the electrolyte can dry, crystallize and clog the vent. Moreover, the protruding vent consumes space in the receptacle, and thus is reducing the possible extent of the capacitor element inside the receptacle.

SUMMARY OF THE INVENTION

Embodiments provide an improved capacitor, for example, a capacitor which is designed such that a vent arranged in the lid of the capacitor is protected from being blocked by precipitations inside the receptacle and to minimize the space consumed from the vent inside the capacitor.

A capacitor is provided which comprises a receptacle with an opening, at least one capacitor element which is disposed inside of the receptacle, and a lid which is sealing the receptacle, wherein a vent is arranged in a recess in an inner surface of the lid.

In this context the recess is a dent, a depression or a cavity in the lid that does not extend from the inner surface of the lid to an outer surface of the lid. Hence, by the recess an additional surface or level is generated within the thickness of the lid. In this sense, a recess cannot be a through hole through the lid forming an opening which connects the outside of the capacitor with an inside of the capacitor.

The lid may be a plate like component of a housing of the capacitor, which may be round or rectangular from a top plan view and which closes the receptacle. The inner surface of the lid may be the surface of the plate facing the capacitor element inside the receptacle.

In this inner surface of the lid the recess may be built as a cavity pointing away from capacitor element in the receptacle. According to the embodiments of the present invention the vent is arranged in the recess.

The vent may enable to relief overpressure from inside the capacitor, especially in case of gas generation due to heat accumulation and chemical reactions in the receptacle. Via diffusion such a vent can release generated gases, such as hydrogen, and prevents capacitor failure due to accumulated internal pressure. This vent can be an overpressure vent, a safety vent or a suitable valve. By arranging the vent in the recess, the vent is more protected from clogging from precipitations inside the receptacle than in a capacitor wherein the vent is not arranged in a recess and therefore reduces the risk for a failure of the capacitor.

Additionally, as the vent protrudes from the lid into the receptacle in conventional capacitors, usually the space inside the receptacle cannot be used totally for the capacitor element which can comprise e.g. a winding and an electrolyte. According to embodiments of the present invention, as the vent is embedded in the lid, the entire space inside the receptacle can be occupied by the capacitor element. As a consequence, the energy density stored in a capacitor can be increased and more energy can be stored in a capacitor according to embodiments of the present invention compared to a conventional capacitor with the same volume.

Preferably the vent may be arranged in the recess in such a way that the end of the vent facing the capacitor element in the receptacle is further away from the capacitor element than the inner surface of the lid. Thereby the vent is even more protected from an impact of precipitations and more space inside the receptacle can be used by the capacitor element.

In one embodiment the recess in the capacitor lid may have an upper level and a lower level, wherein the upper level is further away from the capacitor element than the lower level and wherein the recess is arranged in the upper level. In this arrangement the opening of the vent facing the capacitor element is more protected from undesired particles to enter. Particularly capacitors comprising a fluid inside the receptacle can profit from a two-level recess, as a fluid may be retained to enter the recess by the surface tension at the lower level of the recess.

The recess or the lower level of the recess may be formed as an elongated channel to support the pressure relief by conveying the gas to the vent if the pressure inside the closed capacitor is exceeding a threshold pressure. The channel may extend beyond the vent to assist the gas ejection by leading particles to the vent. Another possibility is to extend the channel over the whole length of the lid to improve the gas ejections due to a pressure raise in the sealed receptacle.

The recess or the lower level of the recess may also be formed as a multitude of channels crossing each other and thereby supporting the gas ejection.

The recess in the lid may be formed by a gap between additional portions attached to the inner surface of the lid. This configuration may be favourable in the production of the capacitor lid. These portions can be of the same material as the lid or another, as long as it is non-reactive with potential chemicals inside the receptacle. For example the material could be a non-conductive material, e.g., synthetic polymers such as TPEs, HDPEs, PPs, PVCs or PTFEs The capacitor explicitly may be an electrolytic capacitor. As electrolytic capacitors are, in addition to self-heating due to energy losses in a dielectric, also at risk to heat accumulation because a wrong polarity is applied, they are more threatened to heating and overpressure than non-electrolytic capacitors. Therefore most electrolytic capacitors have a vent integrated which can benefit embodiments of the present invention.

Especially non-solid electrolytic capacitors, which employ a fluid as electrolyte, may profit of the presented vent configuration as the liquid electrolyte might easily enter the vent and clog it.

As part of the lid has to be spared around the vent for the recess in the inner surface of the lid facing the capacitor element it may be advantageous to bulge the lid around the vent at the outer surface of the lid for stability reason.

The electrodes of the capacitor element may be connected electrically with screw terminals which pass gas tightly through the lid. The screw terminal may be formed to provide an electrical and a mechanical connection to the application the capacitor is required for.

Additionally, it may be to the best advantage to form the lid in such a way that a contact between the vent and the capacitor element such as an electrolyte or a film is avoided. In this way a potential risk for a short-circuit is reduced.

BRIEF DESCRIPTION OF THE DRAWINGS

In the following, preferred embodiments of the present invention are discussed with respect to the figures.

DETAILED DESCRIPTION OF ILLUSTRATIVE EMBODIMENTS

Figure 1:
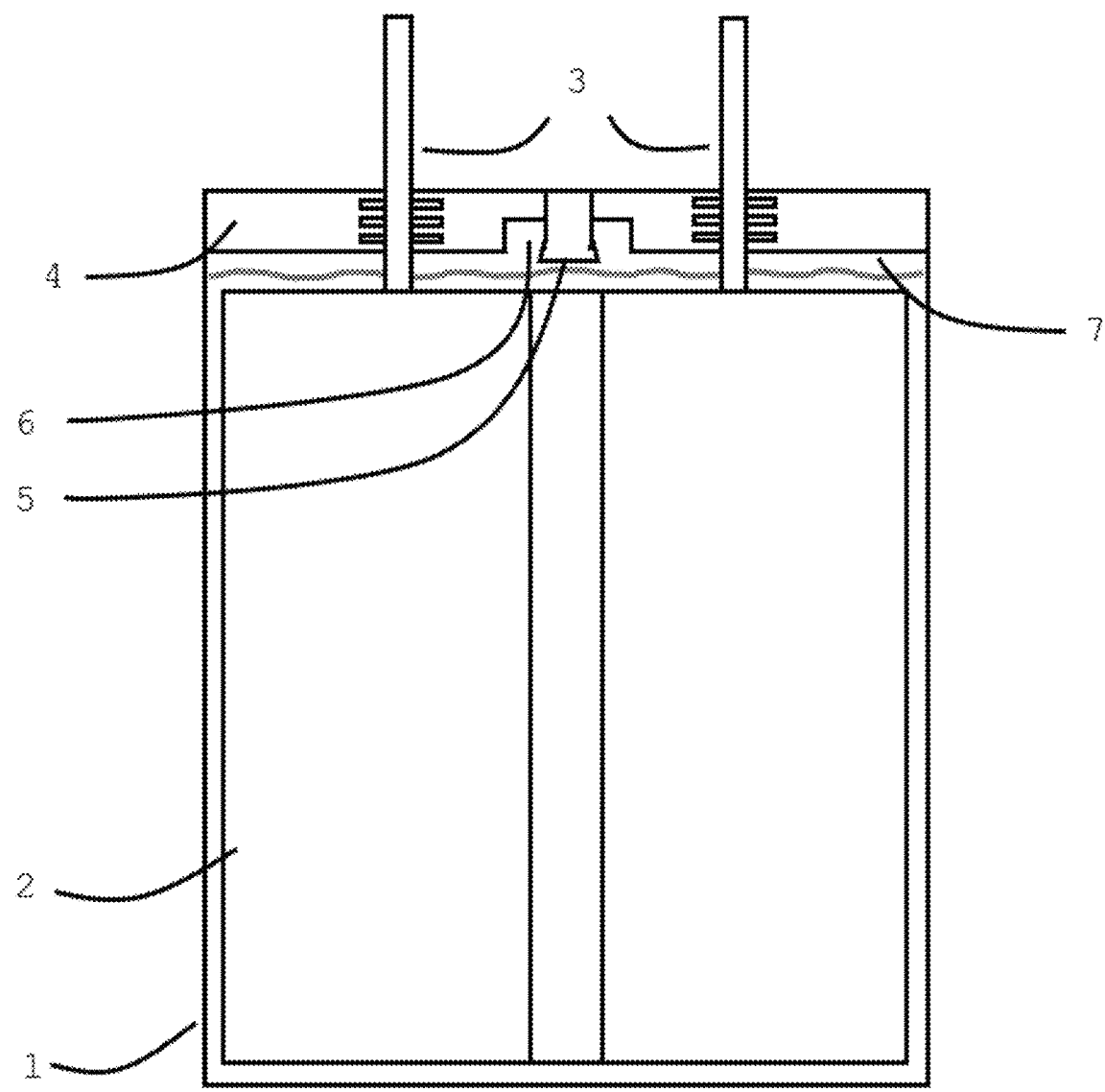
FIG. 1 shows a simplified cross section of a capacitor.

FIG. 1 shows a simplified cross section of a capacitor. The capacitor comprises a receptacle 1. The receptacle's base area can be rectangular, round or any other shape. Inside the receptacle 1 a capacitor element 2 is disposed. The receptacle 1 is sealed with a tight lid 4. At least two screw terminals 3 pass through the lid 4, in a gas tightly way, and connect electrically to electrodes of the capacitor element 2. Here, in the middle of the lid 4 a recess 6 is formed in an inner surface of the lid 7 facing the capacitor element 2. A vent 5 is arranged in the recess 6 to provide pressure relief if the pressure inside the closed receptacle 1 increased, e.g. due to heat generation. If the capacitor is an electrolytic capacitor the capacitor element 2 comprises an electrolyte which can be a fluid.

As the vent 5 is embedded in the recess 6, the opening of the vent 5 facing inside the receptacle 1 is further away from a possibly gas ejecting capacitor element 2 wherein precipitations may be formed by a gas from a vaporizing electrolyte. The arrangement of the vent in the recess provides a protected position for the vent 5 such that the vent 5 is protected from precipitations clogging the vent 5. This reduces the risk for a failure of the capacitor as a clogged vent 5 prevents pressure relief and might lead to a malfunction or even to an explosion of the capacitor. Moreover, because the vent 5 is embedded in the recess 6, the space usually occupied by the vent 5 can be deployed to enlarge the capacitor element 2 inside the receptacle 1. As a consequence, the energy density stored in a capacitor with the same volume can be increased or a capacitor with the same energy storage can be build more compact.

The purpose of the vent 5 is to enable relief of pressure accumulated inside the receptacle 1 due to heat accumulation and especially gas generation. The vent 5 may employ a membrane which allows gases, e.g. hydrogen, to dissipate via diffusion. As the pressure inside the capacitor, especially with a clogged vent 5, can lead to an explosion of the capacitor also a safety, overpressure vent or a valve might be used.

The recess 6 may have a cylindrical, a conical, a cubical, an oblong or any other three-dimensional form suitable for the application.

The receptacle 1 can have any three-dimensional shape appropriate for the requirements of the designated ambience and suitable for the geometry of the capacitor element 2. It can be favourable to fabricate the receptacle 1 and the lid 4 of a material that is gas-tight, or at least fluid tight. In particular if the capacitor is an electrolytic capacitor. The receptacle 1 could be manufactured from a metal, for example, aluminium, steels as carbon steel, stainless steel, tool steel or alloy steel. Other appropriate materials can be synthetic polymers such as TPEs, HDPEs, PPs, PVCs or PTFEs. If the capacitor is at risk of corrosion or degradation the material may be protected with a coating, a plating or another suitable protecting treatment.

The capacitor element 2 also can have any three-dimensional shape, whereby it might be beneficial to utilize the volume spanned by the receptacle 1 to optimize the energy density of the capacitor. The capacitor element 2 can be non-polarized, as a ceramic or film capacitor, or a polarized one. Electrolytic capacitor elements 2 using aluminium, tantalum or niobium as the anode, or polymer capacitor elements 2, using a polymer as the electrolyte, are common polarized ones. Embodiments of the present invention can be employed in capacitors with solid electrolyte, but has the best advantage in non-solid electrolyte as a fluid electrolyte can easily enter and clog the vent 5. In this case the capacitor element 2 can comprise a fluid electrolyte and a winding. But also super-capacitor elements 2 as double-layer capacitors or pseudocapacitors are polarized capacitor elements 2 which may be suitable for embodiments of the present invention. In particular, polarized capacitor elements 2 can readily suffer a short circuit, if wrongly installed, and thereby are predestined to suffer under heat accumulation. The capacitor element 2 can be built of a multitude of capacitor elements 2.

Figure 2:
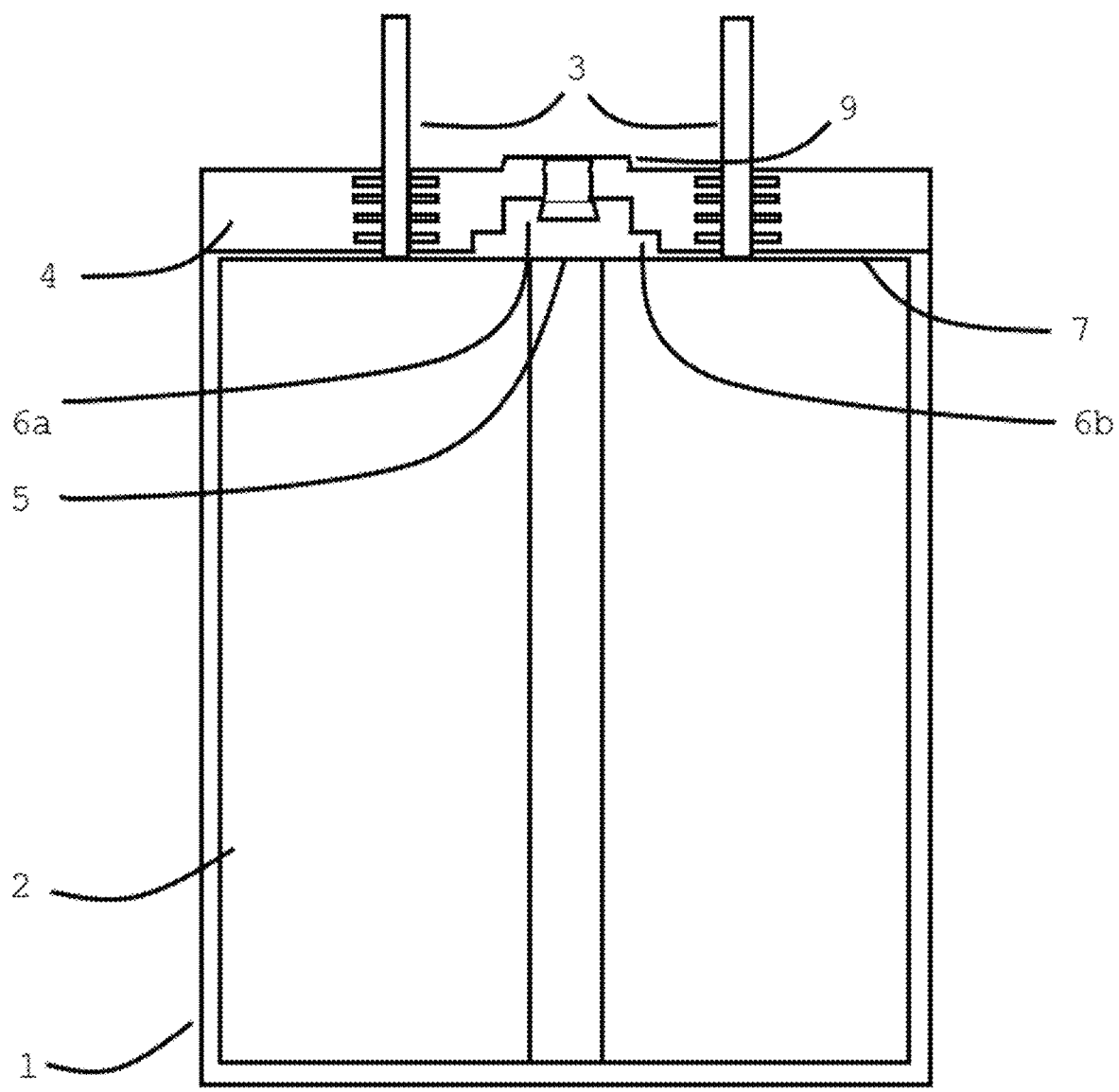
FIG. 2 shows a simplified cross section of another embodiment of a capacitor.

FIG. 2 shows another embodiment of the present invention. In this embodiment the recess 6 in the inner surface of the lid 7 has two levels, an upper level 6a and a lower level 6b, wherein the upper level 6a is further away from the capacitor element 2 than the lower level 6b and wherein the vent 5 is arranged in the upper level 6a. In this illustration the vent 5 is totally ingrained in the upper level 6a of the recess 6. Therewith, the opening or end of the vent 5 facing the capacitor element 2 is further away from the capacitor element 2 than the inner surface of the lid 7. This arrangement enhances the protective properties and improves the prevention of clogging the vent 5. As the vent 5 does not protrude into the receptacle 1 the complete space spanned by the receptacle 1 and the lid 4 can be employed for the capacitor element 2 in contrary to conventional capacitor utilizing vents 5.

Additionally, the lid 4 bulges around the vent 5 on the outer surface of the lid 4. The recess 6 naturally weakens the lid 4 as a volume is missing for forming the recess 6. The bulge 9 on the outer surface of the lid 4 adds additional built volume and thereby improves the stability of the lid 4. Moreover, by the bulge 9 more contact surface is provided between the lid 4 and the vent 5. Hereby the cohesiveness between the vent 5 and the lid 4 is improved.

Figure 3:
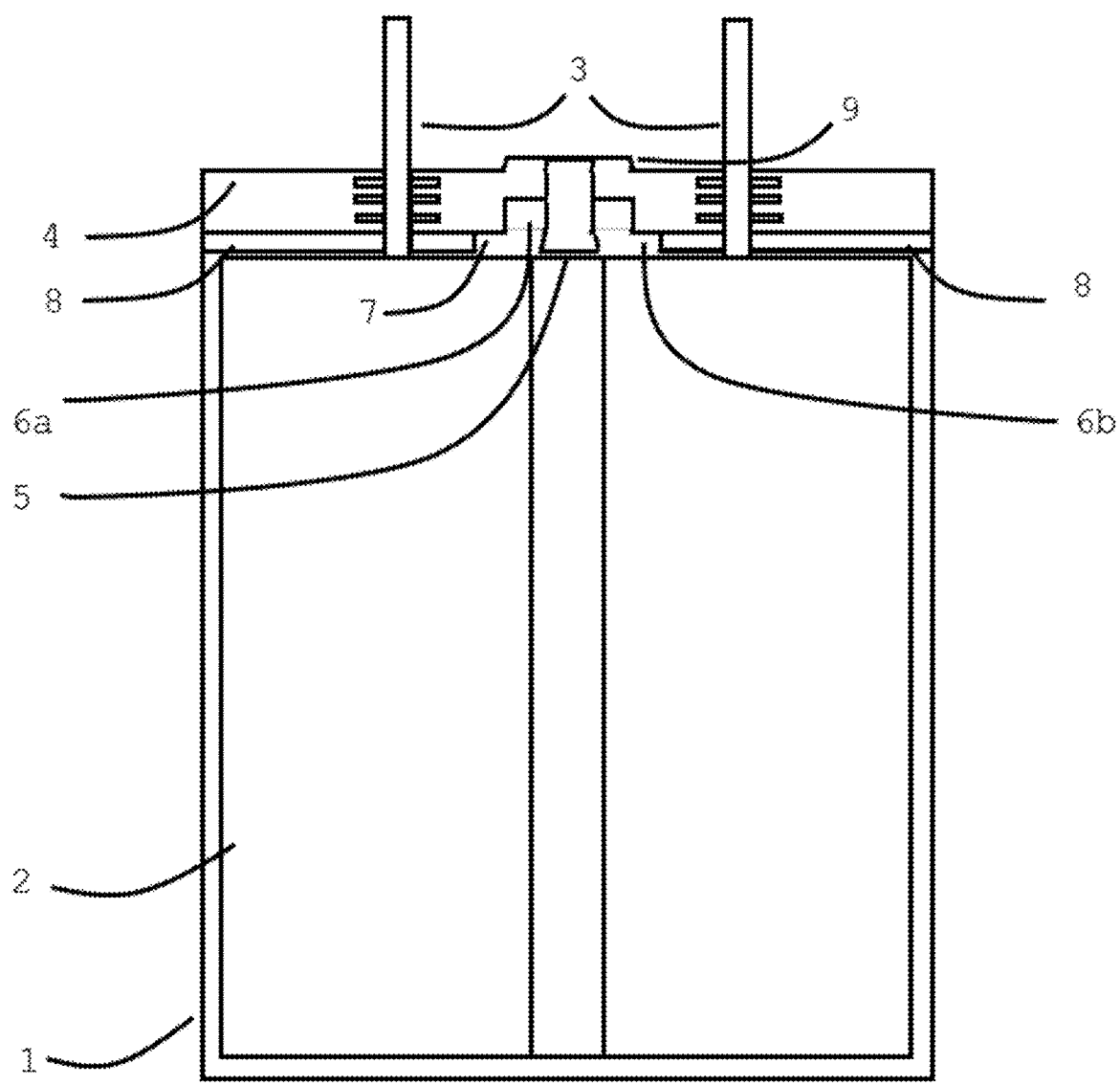
FIG. 3 shows a simplified cross section of a further embodiment of a capacitor.

FIG. 3 shows a schematic drawing of the cross view of a further embodiment of a capacitor. This embodiment also has a recess 6 which has two levels, an upper level 6a and a lower level 6b. Here, the lower level 6b is formed by a gap between additional portions 8 which are attached to the inner surface of the lid 7, while the upper level 6a is a cavity in the lid 4. The vent 5 is arranged in the upper level 6a of the recess 6, but protrudes the lower level 6b of the recess 6 in this embodiment. In this way the available space spanned by the receptacle 1 and the lower edge of the vent 5, which can be used by the capacitor element 2, is increased compared to conventional capacitor without recess 6. As in the previous embodiment the embodiment of FIG. 2 also has a bulge 9 on the outer surface of the lid 4.

The additional portions 8 can be made out of non-conductive materials e.g. synthetic polymers such as TPEs, HDPEs, PPs, PVCs or PTFEs. If the additional portions 8 are at risk of corrosion or degradation the material may be protected with a coating, a plating or another suitable protecting treatment. It may be advantageous to use the same material for the additional portions 8 as for the lid 4 to prevent thermomechanical stress.

Depending on the desired form of the recess 6, the additional portions 8 may have the form of a perforated disk, of semicircles, segments of a circle, rectangular or any other appropriate form.

Figure 4:
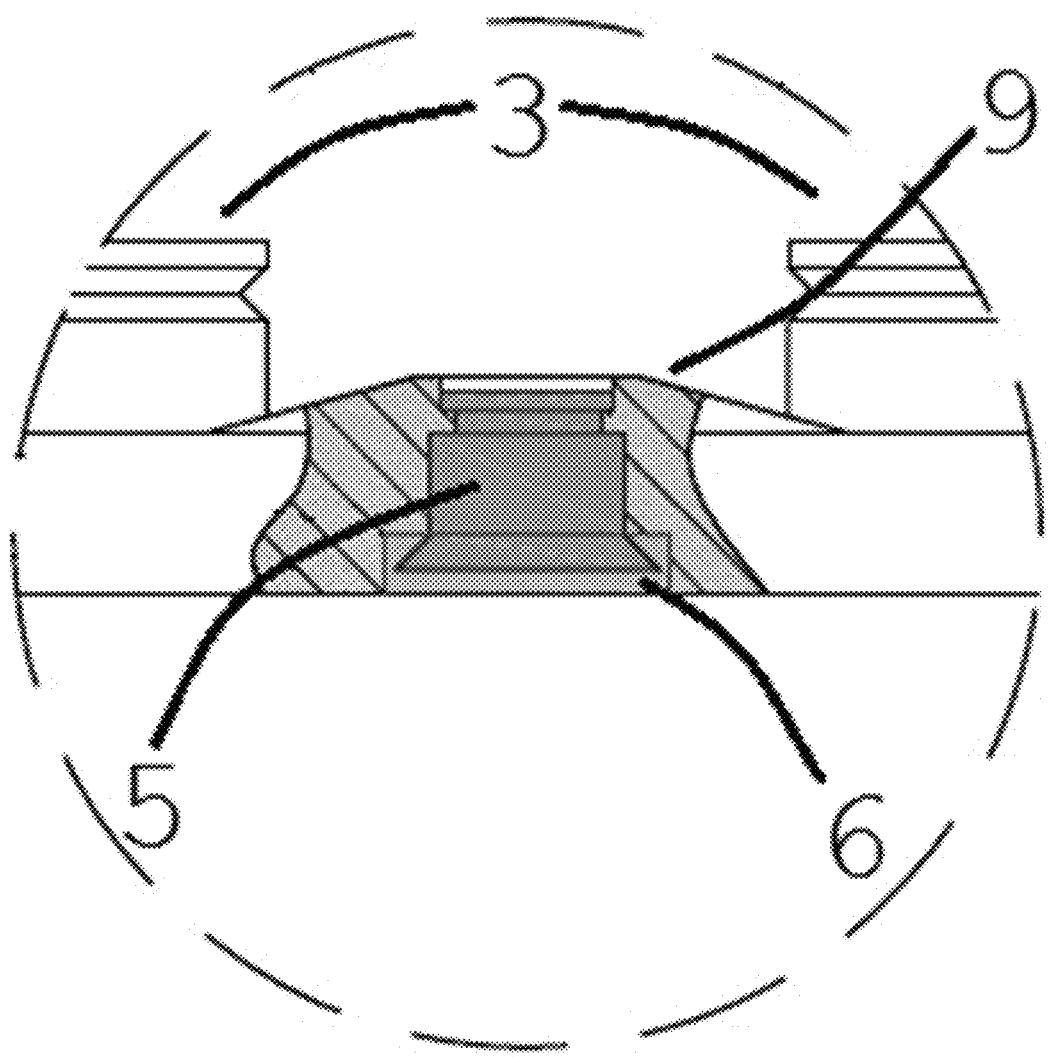
FIG. 4 shows a cross section of a magnification of a lid similar to the embodiment shown in FIG. 1.

FIG. 4 shows a cross section of a magnification of a lid 4 similar to the embodiment shown in FIG. 1, but in this embodiment the lid 4 bulges in the vicinity of the vent 5 at the outer surface of the lid 4 and the vent 5 is ingrained in the recess 6 analogous to FIG. 2 and FIG. 3. The vent 5 in this embodiment is shown in more detail. A portion of the vent 5 embedded in the recess 6 expands in diameter in a downward direction, i.e. towards the capacitor element. This expanded portion conventionally would poke into the receptacle 1. As this expanded portion is ingrained in the recess 6, which is formed with just one level in this embodiment, the vent 5 does not protrude in the receptacle 1. Next to the bulge 9 on the outer surface of the lid 4 parts of the screw terminal 3 to connect the capacitor are illustrated.

Figure 5:
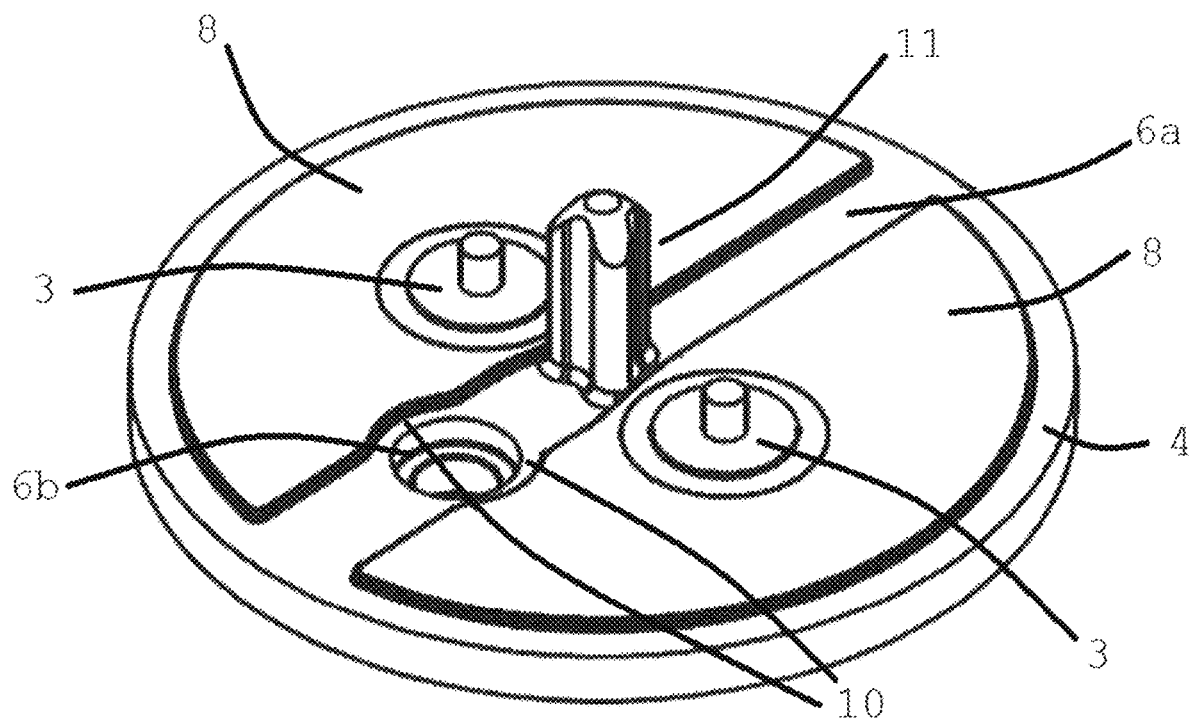
FIG. 5 shows a perspective view of the inner side of the lid according to another embodiment.

In FIG. 5 a perspective view of the inner surface of the lid 7 according to another embodiment is shown. This embodiment is similar to the embodiment shown in FIG. 3. On the inner surface of the lid 7 two semicircle additional portions 8 are attached. The gap in between these additional portions 8 forms the lower level 6b of the recess 6 as a longitudinal channel. In this way the channel extends through the whole length of lid and thereby supports the gas ejection from inside the receptacle 1 through the vent 5 outside. The upper level 6a of the recess 6 is round and positioned non-central in the channel. Small notches 10 are spared in the additional portions 8 on the straight side to spare the room for the round upper level 6a of the recess 6 which is larger in diameter than the channel forming the upper level 6a of the recess 6. In the middle of the lower level 6b of the recess 6 a bolt 11 is adhered to the upper level 6a of the recess 6. This bolt 11 is provided to fix the capacitor element 2, e.g. a winding in an electrolytic capacitor. Next to the bolt 11 the lower end of the screw terminals 3 emerge from the lower surface of each of the additional portions 8.

Figure 6:
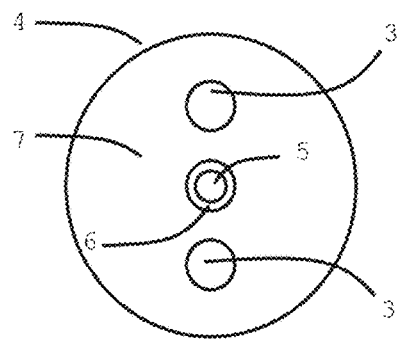
FIGS. 6a-6f shows simplified plan views of an inner surface of different capacitor lids.
Figure 6:
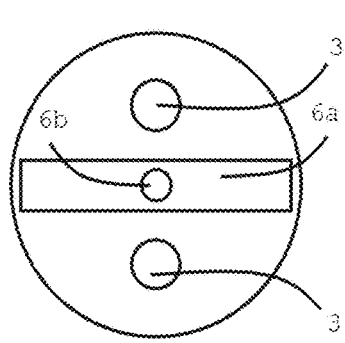
Figure 6:
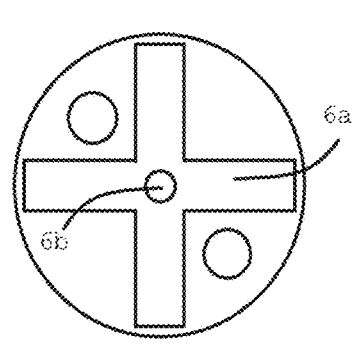
Figure 6:
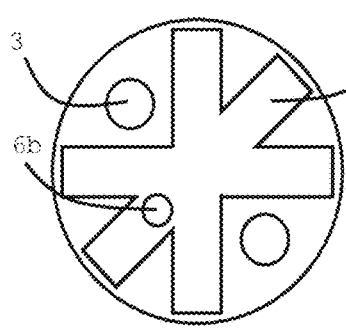
Figure 6:
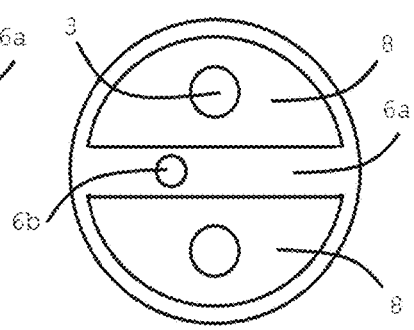
Figure 6:
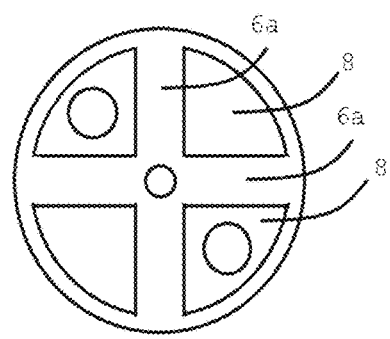

In FIGS. 6a) to 6f) a multitude of schematic drawings of the inner surface of the lid 7 is shown. In all of them the recess 6 extends beyond the vent 5 to support gas ejection through the lid 4. The form of the lid 4 in these schematic drawings is circular here, but could be any other form adequate and fitting to the receptacle 1. The recess 6 of FIG. 6a) is circular and arranged in the centre of the lid 4. The vent 5 is disposed in the recess 6. The two smaller circle off centre are cross sections of the screw terminals 3 passing the lid 4.

In FIG. 6b) the recess 6 is formed as an elongated channel where the vent 5 is contained in the middle. Forming the recess 6 as an elongated channel extending through the whole length of the lid 4 may support the pressure and gas relief by guiding the precipitations to the vent 5. Therefore the surface of the recess 6 parallel to the inner surface of the lid 7 can have a slope leading to the vent 5.

The channel can define a diffusion path. Gas can diffuse along the diffusion path from an inside of the receptacle 1 to the vent 5. The diffusion path helps to avoid tearing of the vent 5, enhancing the maximum life expectancy of the capacitor, while increasing the maximum capacitance at the same time.

In FIG. 6c) the recess 6 is formed as two intersecting channels forming a cross. The vent 5 is positioned at the junction of both channels in the middle of the lid 4. The recess also may be formed with a multitude of crossing channels.

FIG. 6d) exhibits an example with three channels crossing in the middle. In this embodiment the vent 5 is arranged off-centre.

In FIG. 6e) two additional semi-circular portions are attached to the lid 4 forming the recess 6 by the gap in between the portion kept clear. Here, the vent 5 is also arranged off centre and the channel extends through the whole length of the lid 4.

In FIG. 6f) the recess 6 is also formed by a gap kept clear in between additional portions 8 attached to the lid 4. The additional portions 8 are quarter circles and thereby create a recess 6 which has a cruciform. The crossing channels extend through the whole length of the lid 4 to support particle and gas ejection in case of a pressure rise inside the receptacle 1. In this example the vent 5 is arranged in the middle of the lid 4 and the cross.

It has to be noticed that the invention is not limited to the layouts described before and that combinations of the layouts are possible.

The invention claimed is:

1. A capacitor comprising:
   a receptacle with an opening;
   at least one capacitor element disposed inside of the receptacle; and
   a lid sealing the receptacle, the lid comprising:
      a recess arranged in an inner surface of the lid; and
      a vent arranged in the recess,
      wherein the recess is an elongated channel.

2. The capacitor of claim 1, wherein the vent is arranged in the recess such that an end of the vent facing the capacitor element is further away from the capacitor element than the inner surface of the lid.

3. The capacitor of claim 1, wherein the recess has an upper level and a lower level, wherein the upper level is further away from the capacitor element than the lower level, and wherein the vent is arranged in the upper level.

4. The capacitor of claim 3, wherein the lower level of the recess is the channel.

5. The capacitor of claim 3, wherein the lower level of the recess is a plurality of channels crossing each other.

6. The capacitor of claim 1, wherein the recess is a plurality of channels crossing each other.

7. The capacitor of claim 1, wherein the recess is formed by a gap between additional portions attached to the inner surface of the lid.

8. The capacitor of claim 1, wherein the capacitor element contains electrolyte.

9. The capacitor of claim 8, wherein the lid is formed such that the vent has no contact to the capacitor element or the electrolyte.

10. The capacitor of claim 8, wherein the electrolyte is non-solid.

11. The capacitor of claim 1, wherein the vent has a membrane.

12. The capacitor of claim 1, wherein the vent is a safety or overpressure vent.

13. The capacitor of claim 1, wherein the lid has a bulge at an outer surface around the vent.

14. The capacitor of claim 1, wherein two screw terminals are connected electrically with designated electrodes of at least one capacitor element and pass gas-tightly through the lid.

\* \* \* \* \*